Nov. 26, 1957 H. RUMSEY, JR Re. 24,396

APPARATUS FOR HEAT SEALING AND SEVERING THERMOPLASTIC MATERIAL

Original Filed Nov. 26, 1951 2 Sheets-Sheet 1

INVENTOR.

Herbert Rumsey, Jr.

BY Duell & Kane

ATTORNEYS

Nov. 26, 1957 H. RUMSEY, JR Re. 24,396

APPARATUS FOR HEAT SEALING AND SEVERING THERMOPLASTIC MATERIAL

Original Filed Nov. 26, 1951 2 Sheets-Sheet 2

INVENTOR.
Herbert Rumsey, Jr.
BY Duell & Kane

ATTORNEYS

United States Patent Office

Re. 24,396
Reissued Nov. 26, 1957

24,396

APPARATUS FOR HEAT SEALING AND SEVERING THERMOPLASTIC MATERIAL

Herbert Rumsey, Jr., Rochester, N. Y., assignor, by mesne assignments, to W. R. Grace & Co., Cambridge, Mass., a corporation of Connecticut Original No. 2,725,699, dated December 6, 1955, Serial No. 258,193, November 26, 1951. Application for reissue October 3, 1956, Serial No. 613,799

14 Claims. (Cl. 53—219)

Matter enclosed in heavy brackets [ ] appears in the original patent but forms no part of this reissue specification; matter printed in italics indicates the additions made by reissue.

This invention relates to improved apparatus for heat sealing and severing thermoplastic sheet material in connection with the wrapping of packages and has particular relation to the type of apparatus shown in my co-pending patent application Serial No. 198,107 filed November 29, 1950, now Patent No. 2,635,672.

It is an object of the present invention to provide improved apparatus of the above character which is more flexible and can be readily adjusted for accommodating packages of various sizes and shapes and for providing variations in length of overlap in the wrapping material.

A further object is the provision of such apparatus embodying improved tensioning mechanism for the thermoplastic sheet material and which also has automatic mechanism for retracting the thermoplastic wrapping material after it has been severed and holding it in a convenient position to be grasped by the operator.

Another object is the provision of apparatus of the above character in which the heat healing mechanism may be removed and another type of heat sealing mechanism substituted in its place, or in which the apparatus may be used without separate heat sealing mechanism with the heat severing mechanism performing the requisite function.

Other objects include the provision of improved package wrapping apparatus of simplified construction which can be readily utilized by unskilled operators, which embody novel heat sealing and severing mechanism and also embody an improved package support permitting a partially wrapped package to be held in a convenient position so as to easily fold the end film extremities underneath the package.

In the accompanying drawings—

Figure 1:
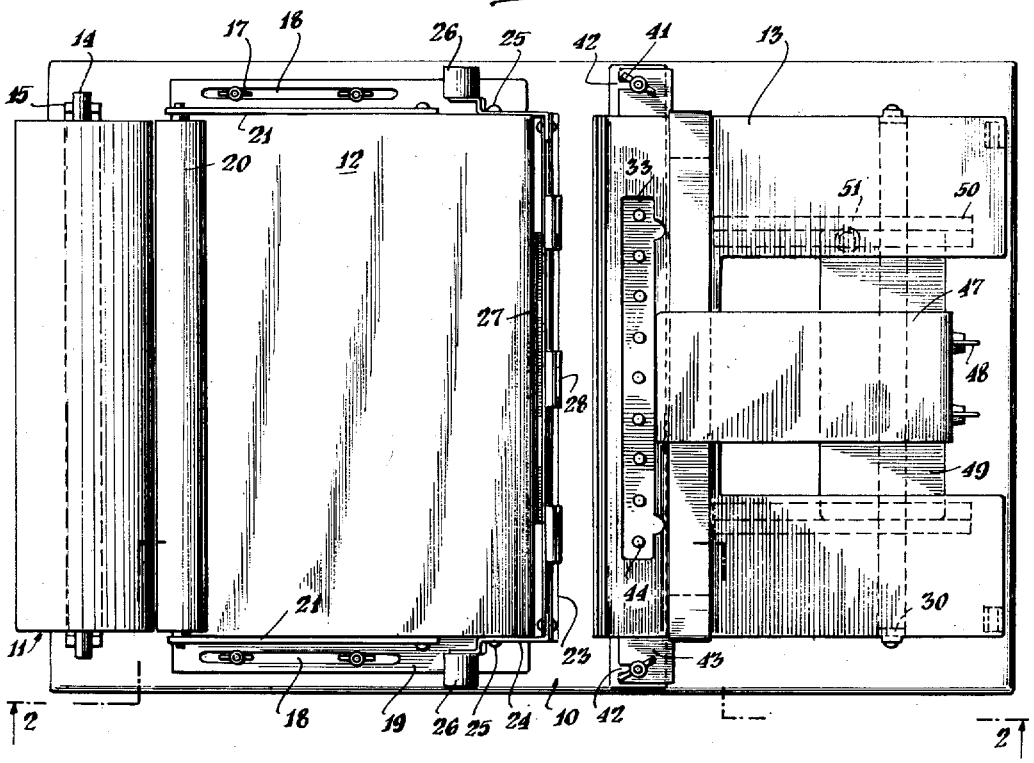
Fig. 1 is a plan view of apparatus embodying my invention.
Figure 2:
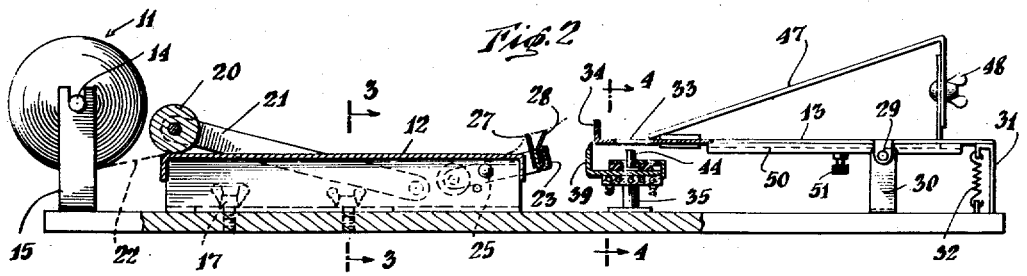
Fig. 2 is a view partially in side elevation and partially in section on the line 2—2 of Fig. 1.
Figure 3:
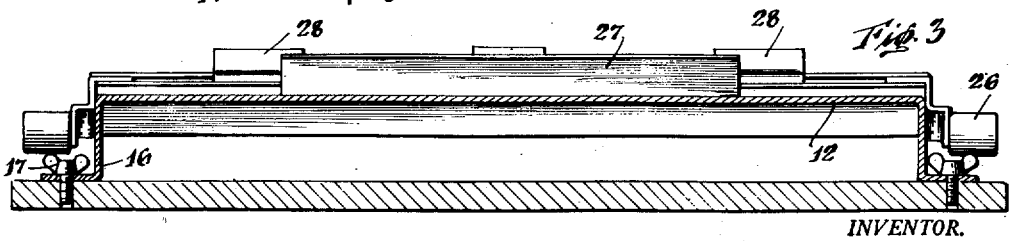
Figure 4:
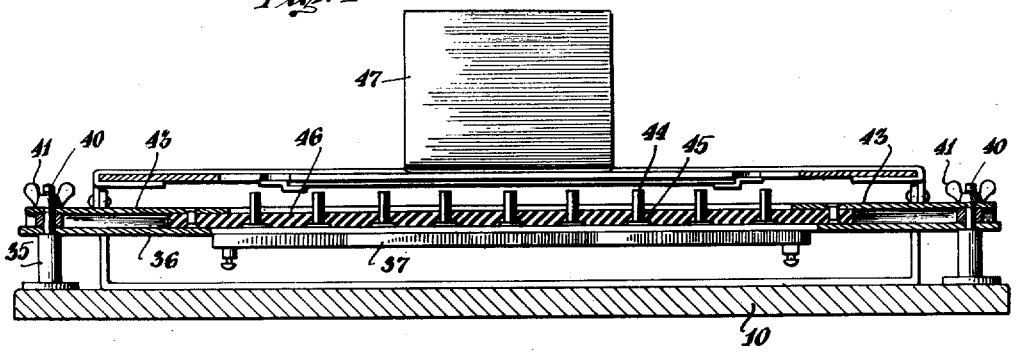
Figure 5:
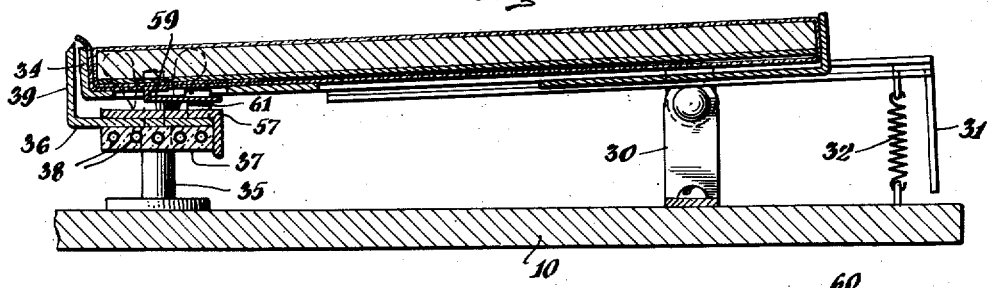
Figure 6:
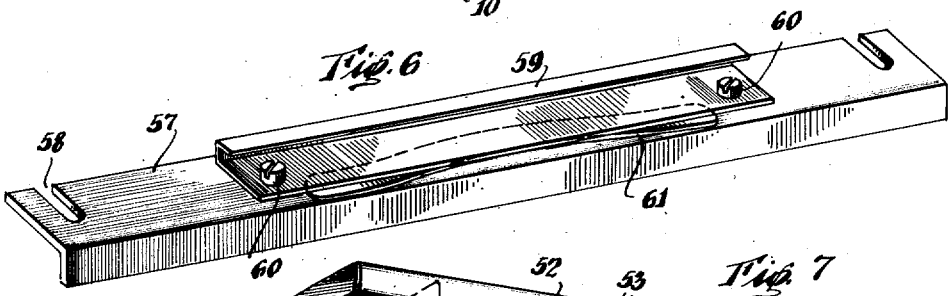
Figure 7:
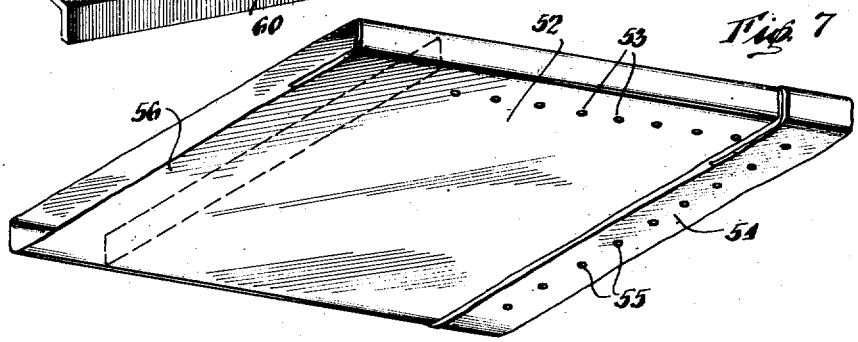

Figs. 3 and 4 are cross-sectional views in the direction of the arrows on the lines 3—3 and 4—4 respectively of Fig. 2;

Fig. 5 is a longitudinal sectional view through the heat sealing platform showing a modified type of heat sealing mechanism;

Fig. 6 is a perspective view of the modified type of heat sealing mechanism; and Fig. 7 is a perspective view of one type of package which may be wrapped by means of my apparatus showing it in the process of being wrapped.

My apparatus comprises generally a base plate 10, a roll of thermoplastic sheet wrapping material 11 suitably mounted thereon, a wrapping platform 12 adjustably mounted on the base plate 10 adjacent the roll of wrapping material and a heat sealing platen or platform 13 mounted on the base plate adjacent the wrapping platform.

The roll of thermoplastic sheet wrapping material is suitably supported as on shaft 14 resting in brackets 15 mounted on the support 10. The thermoplastic sheet material may be of any desired type as, for instance, rubber hydrochloride such as that sold commercially as Pliofilm, a polyvinyl resin such as that sold commercially as Saran, or a cellulose ester such as cellulose acetate.

The platform 12 is arranged at a convenient height and is supported on side wall members 16 resting on the base plate and adjustably secured thereto by the thumb screws 17 extending through the slots 18 in horizontal flanges 19 provided at the lower end of the side wall members. By loosening the thumb screws the wrapping platform 12 may be shifted towards and away from the heat sealing platform 13 so that the apparatus may be used more conveniently in wrapping packages of different sizes and shapes and so as to provide a greater, or lesser, overlap in the wrapping material.

When the wrapping platform has been shifted to the desired position the thumb screws 17 are tightened so as to hold it securely in place.

So as to prevent the wrapping material from being too readily or freely withdrawn from the roll 11 I also provide tension mechanism which takes the form of friction roller 20 mounted for rotation at the free ends of the arms 21 which, in turn, are pivoted near the forward end of the wrapping platform. The friction roller 20 is disposed near the leading end of the wrapping platform and normally is urged by gravity into contact therewith. The wrapping material from the roll 11 is fed from the roll beneath the friction roller 20 as shown in dotted lines at 22 in Fig. 2 and thence extended over the surface of the wrapping platform 12. Thus, when the operator pulls a length of wrapping material over the surface of the wrapping platform after each successive wrapping operation the friction roller prevents the wrapping material from withdrawing too rapidly or readily from the supply roll.

The initial wrapping operation takes place on the platform 12 when the operator places the package contents on the length of wrapping material and wraps it around the bottom, top and two sides thereof. The partially wrapped package is then transferred to the heat sealing and severing platform 13 where the length of wrapping material is heat severed. Normally upon the severing of the wrapping material it would drop downwardly between the two platforms and it would be inconvenient for the operator to grasp the end of the material so as to wrap it around the next package. To overcome this difficulty I have provided an improved wrapper elevating member 23 in the form of a cross-arm formed integrally with a pair of levers 24 which are pivoted at 25 to the side walls of the platform 12 and which are counterweighted at 26 so that the wrapper elevating member is normally disposed in a plane above the platform.

I have found that by providing the wrapper elevating member with an upwardly projecting flange 27 at the central portion thereof and with spaced, forwardly projecting fingers 28, the end of the wrapping material is held in a convenient position so that it can be readily grasped by the operator as shown in dotted lines in Fig. 2.

The heat sealing and severing platform 13 is pivotally mounted at 29 on a pair of spaced upright standards 30 and is normally held in horizontal position by helical springs 32, with the legs 31 resting on the base plate 10, The leading edge of the platform 13 may be pivoted downwardly by applying downward force or pressure thereto.

Adjacent its leading edge the platform is provided with an elongated aperture 33 serving as an opening for exposing the heat sealing mechanism. Immediately in front of the aperture is an upturned flange 34 which serves to position the package on the platform and also to protect the wrapping material from the heat severing mechanism while the platform is elevated. The heat sealing and severing devices are supported on a pair of spaced posts 35. Extending between the posts is a metal strip 36 preferably made of a good conducting material, such as copper, and supported beneath the metal strip 36 is heating unit 37 having a plurality of electric resistance wires 38 disposed therein and suitably connected in circuit so that they may be connected to a source of electric current. When the heating elements are connected to the source of electric current they serve to heat the metal plate 36.

Projecting upwardly from the leading edge of the plate 36 is the heat severing blade 39 which is formed integrally with the plate. Due to the fact that it is made of good heat conducting material the heat severing blade readily assumes the approximate temperature of the plate. When platform 13 is in its elevated position flange 34 is disposed above the upper edge of the blade 39 so that the wrapping material extending from the wrapping platform 12 across to a package disposed on platform 13 is held out of contact with the blade. However, when the lead edge of platform 13 is depressed as shown in Fig. 5, the heat severing blade 39 projects above flange 34 so that the wrapping material will contact the blade and thus be heat severed.

The upper ends of the standards 35 are provided with threaded studs 40 to which the wing nuts 41 are applied. By loosening the wing nuts the slotted ends 42 of heat sealing plate 43 may be inserted in engagement with the threaded studs 40. The wing nuts 41 can then be tightened to hold the plate in place.

Projecting upwardly through the central portion of plate 43 are the heat sealing prongs 44. These prongs are provided with enlarged heads 45 resting on the heating plate 36. Between the heat sealing plate 43 and the heating plate 36 (as well as the heads 45 of the prongs) I normally provide heat insulating material 46 such as asbestos so that the plate 43 does not become unduly warm. The prongs 44 are made of good heat conducting material such as copper and the upper ends thereof accordingly assume the temperature of the plate 36. When the platform [33] *13* is in elevated horizontal position the prongs 44 are spaced beneath the aperture 33. However, when platform [33] *13* is depressed the prongs project outwardly through the aperture.

When the partially wrapped package is placed on platform 13 the overlapping portions of the sheet material are placed over the opening 33 and the platform is then depressed so that the heated prongs 44 engage the material. The temperature of the prongs is above the fusing point of the thermoplastic sheet material and accordingly apertures are fused therein causing the layers of material to be sealed together around the edges of the apertures. Simultaneously the sheet material engages the heat severing blade 39 and is severed thereby.

A partially wrapped package is shown at 52 in Fig. 7 and the row of heat sealing apertures thus formed are shown at 53. Thereafter, the side edges of the package may be folded over as shown at 54 and similar heat sealing apertures 55 formed through the superimposed layers by pressing them downwardly over the opening 33 on to the prongs 44. Similarly, the side edges 56 may be folded over and thus heat sealed.

In folding the projecting portions of the wrapping material 54 and 56 underneath the package I may place the package upon an angularly disposed ramp or platen 47. When placed on the ramp the package will project beyond the two side edges of the ramp so that it is a simple matter to fold the projecting portions of the wrapping material underneath the package. The ramp 47 is vertically adjustable by means of thumb screw 48 on a base plate 49. The base plate 49 slides in a pocket 50 in the platform 13. Thus the platen 47 may be shifted forwardly or rearwardly with reference to platform 13 and held in adjusted position by means of the knurled screw 51. When the side edges have been folded underneath the package they are heat sealed in the manner described above.

I have found that a relatively flat, broad package as shown in Fig. 7 may be rested directly upon the platform 13. The platen 47 is convenient where a long narrow package or an irregular shaped package is wrapped.

If preferred, a different type of plate such as shown in Figs. 5 and 6 may be substituted for plate 43. Thus, I have shown a heat sealing plate 57 having slots 58 formed therein which are fitted into engagement with the threaded studs 40 in the same manner as plate 43. Thereafter, the wing nuts 41 are tightened to hold the plate in place. Adjustably mounted on the plate 57 is the continuous heat sealing bar 59 secured to the plate by the adjustable screws 60. The heat sealing bar 59 is held in spaced relationship with respect to the plate 57 by means of leafspring 61. The leafspring 61 is formed to normally press the blade upwardly away from plate 57. By tightening the screws 60 the bar is shifted closer into more intimate contact with the plate 57. By loosening the screws the spring tends to cause the bar to be spaced a greater distance from the plate. Thus, the screws can be employed to regulate the temperature of the heat sealing bar 59. Where it is desired to increase the temperature of the bar the screws are tightened. When it is desired to decrease the temperature of the bar the screws are loosened.

When the heat sealing bar 59 is employed, the apparatus is used in the same manner by first partially wrapping the package on platform 12, then heat sealing and completing the wrapping operation on platform 13. Instead of forming a plurality of heat sealing apertures extending through the material the temperature of bar 59 should be adjusted so as to cause a continuous weldlike seal between the respective overlapping layers of thermoplastic material.

Under certain circumstances it might be desirable to operate the apparatus without the heat sealing prongs 44 or the heat sealing bar 59. To do this the screws 60 of the heat sealing plate 57 are completely removed and the bar 59 is separated from plate 57. Plate 57 is then inserted in place, without the bar 59, with slots 58 in engagement with the threaded studs 40 and with the wing nuts 41 tightened. The package may then be partially wrapped on platform 12 in the manner heretofore described and then placed on platform 13 with the overlapped layers over the aperture 33. The platform 13 is then pressed downwardly to sever the thermoplastic wrapping material by means of blade 39. Immediately upon severing the cut extremity of the film is tacky or in a partially fused condition. By tilting the leading edge of the package upwardly and thereby pressing the severed edge of the wrapping material against the package the severed edge will be sealed to the package.

My apparatus may be used for wrapping packages of various sizes and shapes in thermoplastic sheet material. It will be seen that when the final operations are performed on platform 13 and the platform is depressed so that the heating blade 39 severs the thermoplastic sheet material, the wrapper elevating device 23 causes the wrapper to immediately withdraw from the heat severing blade and thereafter holds the severed end of the wrapping material in convenient position to be grasped by the operator. By immediately withdrawing the edge of the wrapping material from the severing blade, heat damage to the edge of the material is prevented.

The friction roller 20 prevents the wrapping material from being withdrawn too freely from the supply roll 11.

By adjusting the wrapping platform 12 away from the heat sealing platform 13 a longer end of wrapping material which will provide a greater amount of overlap is obtained. Where a small amount of overlap is desired the wrapping platform 12 is shifted toward the heat sealing platform 13.

It will thus be seen that I have provided an improved heat sealing and severing apparatus which may be used in connection with the wrapping of packages in thermoplastic material, which is flexible and can be readily adjusted to wrapping packages of various sizes and shapes and so as to provide various degrees of overlap of material.

It will also be seen that the type of heat seal may be readily varied and controlled and that the heat severed edge of the wrapping material is withdrawn from the heat severing mechanism and held in convenient position to be grasped by the operator. Modifications may be made in the illustrated and described embodiments of my invention without departing from the invention as set forth in the accompanying claims.

I claim:

1. Apparatus for heat sealing and severing thermoplastic sheet material in the wrapping of packages comprising: a base member; means for supporting a supply of thermoplastic sheet material on the base member; a wrapping platform mounted on the base member; a heat sealing and severing platform mounted on the base member in spaced relationship with respect to the wrapping platform and having an elongated heat severing member disposed adjacent the leading edge thereof for heat severing the sheet material as it is extending from one platform to the other; and sheet retracting and elevating mechanism in the form of a counterweighted pivotally mounted member extending transversely of the trailing end of the wrapping platform so as normally to be disposed in a plane above the wrapping platform but being shiftable to a position beneath the trailing end of the platform.

2. Apparatus for heat sealing and severing thermoplastic sheet material in the wrapping of packages as set forth in claim 1 in which the sheet retracting and elevating mechanism is formed with an upwardly projecting blade adjacent the central portion thereof and with a plurality of spaced fingers projecting outwardly at an angle to the blade.

3. Apparatus for heat sealing and severing thermoplastic sheet material in the wrapping of packages comprising: a base member; means for supporting a roll of thermoplastic sheet material on the base member so that it may be readily dispensed therefrom; a wrapping platform mounted on the base member adjacent the aforesaid means and adjustable towards and away from the hereinafter mentioned heat sealing and severing platform; a friction roller journaled in a pair of arms pivotally mounted adjacent the leading end of the wrapping platform so as to be engageable with the sheet material to exert a drag thereon; a heat sealing and severing platform mounted on the base member adjacent the trailing end of the wrapping platform and having an elongated heat severing member adjacent the leading end thereof for severing thermoplastic sheet material extending between the two platforms; and sheet elevating and retracting mechanism in the form of a counterweighted pivotally mounted member extending transversely of the trailing end of the wrapping platform so as normally to be disposed in a plane above the wrapping platform but being shiftable to a position beneath the trailing end of the platform.

4. Apparatus for heat sealing and severing thermoplastic sheet material in the wrapping of packages comprising: a base member; means for supporting a roll of thermoplastic sheet material on the base member so that it may be readily dispensed therefrom; a wrapping platform mounted on the base member adjacent the aforesaid means and adjustable towards and away from the hereinafter mentioned heat sealing and severing platform; a friction roller journaled in a pair of arms pivotally mounted adjacent the leading end of the wrapping platform so as to be engageable with the sheet material to exert a drag thereon; a heat sealing and severing platform mounted on the base member so that it may be lowered to operative position and elevated to inoperative position; a heating device disposed beneath and adjacent the trailing edge of the heat sealing and severing platform and formed with an upturned heat severing blade along one edge thereof and formed with means for releasably retaining a heat sealing plate in place, said heat severing blade being disposed beneath the heat sealing and severing platform when it is in elevated position and being disposed above said platform when it is in lowered position; and sheet elevating and retracting mechanism in the form of a counterweighted pivotally mounted member extending transversely of the trailing edge of the wrapping platform so as normally to be disposed in a plane above the wrapping platform but being shiftable to a position beneath the trailing edge of said platform.

5. In apparatus for heat sealing and severing thermoplastic sheet material the combination of: a support, heating means including a heating element mounted on the support, a heating plate mounted on the support in heat transfer relationship with the heating element and having an elongated heat severing member projecting therefrom and heat sealing means carried by the support in heat transfer relationship with the heating plate.

6. Apparatus for heat sealing and severing thermoplastic sheet material as set forth in claim 5 in which the elongated heat severing member is a flange formed integrally with the heating plate.

7. Apparatus for heat sealing and severing thermoplastic sheet material as set forth in claim 5 in which the heat sealing means includes a metal member in direct contact with the heating plate.

8. In apparatus for heat sealing thermoplastic sheet material the combination of: elongated heating means; an elongated heat sealing device disposed adjacent and parallel to siad heating means; resilient means interposed between the elongated heating means and the elongated heat sealing device so as normally to urge the heat sealing device away from the heating means; and adjustable fastening means securing said heat sealing device to said heating means whereby they may be shifted towards or away from each other.

9. Apparatus for heat sealing thermoplastic sheet material as set forth in claim 8 in which the resilient means is an elongated leaf type of spring engaging both the heating means and the heat sealing device and arranged in parallel relationship therewith.

10. Apparatus for heat sealing and serving thermoplastic sheet material in the wrapping of packages comprising: a supporting structure having a platform thereon; means for rotatably supporting a roll of sheet wrapping material so that the web of wrapping material may be drawn over the platform; an elongated heat severing member disposed transversely of the supporting structure adjacent the leading edge of the platform; a sheet retracting and elevating mechanism in the form of a counterweighted pivotally mounted member extending transversely of the supporting structure between the heat severing member and the support for the roll of wrapping material so that the upper surface of said pivotally mounted member is normally disposed in a plane above said heat severing member but being shiftable to a position beneath said heat severing member.

*11. An apparatus for providing and severing thermoplastic sheet material in the wrapping of packages comprising a supporting structure having a platform thereon, means for rotatably supporting a roll of sheet wrapping material so that the web of wrapping material may be*

*drawn over the platform, an elongated heat severing member disposed transversely of the supporting structure and parallel to and spaced from the leading edge of the platform, and a sheet retracting and elevating mechanism between the heat severing member and the support for the roll of wrapping material, said retracting and elevating mechanism comprising a pivotally mounted member extending transversely of the supporting structure and being normally disposed in a plane above the platform but being shiftable to a position substantially adjacent and parallel the platform between said support for the roll of wrapping material and said heat severing member such that said web of wrapping material extending across said platform and over said elevating mechanism may be shifted into association with said severing means and means for returning said pivotally mounted member to said normal position, whereby said web is withdrawn from association with said severing means.*

*12. An apparatus as set forth in claim 11, wherein said means for returning said pivotally mounted member to its normal position is a counterweight.*

*13. An apparatus as set forth in claim 11, and drag means between said support for the roll of wrapping material and said platform whereby the material may be controlled as it is drawn from said support.*

*14. Apparatus for severing thermoplastic sheet material in the wrapping of packages comprising a supporting structure having a platform thereon, means for rotatably supporting a roll of sheet wrapping material so that the web of wrapping material may be drawn over the platform, an elongated heat severing member disposed transversely of the supporting structure and parallel to and spaced from the platform, and a sheet retracting device extending transversely of the apparatus and parallel to the platform and located between the heat severing member and the support for the roll of wrapping material, said retracting device being mounted on said supporting structure for relative vertical shift movement between elevated and lowered positions and being located in the path of travel of the web of wrapping material so that the web engages the web retracting device and causes it to shift vertically when tension is applied to the web in pulling it outwardly from the supply roll and so that the retracting device shifts vertically under the force of gravity to retract the web from the heat severing member when the web is severed thereby and tension is released therefrom.*

References Cited in the file of this patent or the original patent

UNITED STATES PATENTS

| | | |
|---|---|---|
| 427,649 | Westervelt | May 13, 1890 |
| 1,515,744 | Miller | Nov. 18, 1924 |
| 1,530,977 | Brady et al. | Mar. 24, 1925 |
| 1,940,561 | Moore | Dec. 19, 1933 |
| 1,960,342 | Marasso | May 29, 1934 |
| 1,963,666 | McCarthy et al. | June 19, 1934 |
| 2,023,147 | Petskeyes | Dec. 3, 1935 |
| 2,027,010 | Zeigler | Jan. 7, 1936 |
| 2,054,394 | Shevlin | Sept. 15, 1936 |
| 2,462,254 | Campbell | Feb. 22, 1949 |
| 2,635,672 | Rumsey | Apr. 21, 1953 |